(12) United States Patent
McCartney

(10) Patent No.: US 10,347,228 B2
(45) Date of Patent: Jul. 9, 2019

(54) MUSIC SYSTEM HAVING AN ASYMMETRICAL KEYBOARD LAYOUT AND NOTATION SYSTEM AND METHOD OF USING SAME

(71) Applicant: James Clyde McCartney, Philadelphia, PA (US)

(72) Inventor: James Clyde McCartney, Philadelphia, PA (US)

(73) Assignee: Steven James Saulsbury, Philadelphia, PA (US)

( * ) Notice: Subject to any disclaimer, the term of this patent is extended or adjusted under 35 U.S.C. 154(b) by 0 days.

(21) Appl. No.: 15/685,523

(22) Filed: Aug. 24, 2017

(65) Prior Publication Data

US 2019/0066636 A1    Feb. 28, 2019

(51) Int. Cl.
*G09B 15/02* (2006.01)
*G10G 1/02* (2006.01)

(52) U.S. Cl.
CPC ............. *G10G 1/02* (2013.01); *G09B 15/026* (2013.01)

(58) Field of Classification Search
CPC .. G10G 1/02; G09B 15/026; G10H 2220/226; G10H 2220/015
USPC ........................................................ 84/483.2
See application file for complete search history.

(56) References Cited

U.S. PATENT DOCUMENTS

| | | |
|---|---|---|
| 152,726 A | 7/1874 | Cramer |
| 334,484 A | 1/1886 | Stewart |
| 3,022,698 A | 2/1962 | Lucas |
| 3,331,271 A | 7/1967 | Glenn |

(Continued)

FOREIGN PATENT DOCUMENTS

| | | |
|---|---|---|
| WO | 1995004345 A1 | 2/1995 |
| WO | 2009031162 A2 | 3/2009 |

OTHER PUBLICATIONS

Wagner, James; "3 year-old plays the piano in the key of red, blue, green"; http://www.latimes.com/local/la-me-pianoto4-2008oct04-story.html; Oct. 4, 2008; 2 pages.
"Free Christmas Sheet Music"; http://www.zebrakeys.com/blog/2009/10/free-christmas-sheet-music; Jul. 29, 2016; 9 pages.
"Learning the Piano with Lego Duplos and Color Coded Keys"; https://theyhomeschoolme.wordpress.com/2014/08/04/learning-the-piano-with-lego-duplos-and-color-coded-keys/; Aug. 4, 2014; 4 pages.

(Continued)

*Primary Examiner* — Jeffrey Donels
(74) *Attorney, Agent, or Firm* — Blank Rome LLP; Matthew J. Esserman

(57) ABSTRACT

A music system having an asymmetrical keyboard layout and a notation system and method of using same are disclosed. The music system includes an asymmetrical keyboard layout comprising at least one octave. Each octave includes consecutively ascending keys of consecutively alternating first and second colors, respectively, extending throughout the entirety of each octave. The music system also includes a notation system comprising a staff including consecutively ascending and alternating lines and spaces. The consecutively ascending and alternating lines and spaces correspond to the consecutively ascending keys within each octave, respectively. Notes positioned on the lines correspond to keys having the first color, and notes positioned substantially entirely within the spaces correspond to keys having the second color. Embodiments foster a coherent music system that enables a user to learn, read, manipulate, and play music with great understanding and ease, using the asymmetrical keyboard layout and notation system.

32 Claims, 16 Drawing Sheets

(56) References Cited

U.S. PATENT DOCUMENTS

| | | | |
|---|---|---|---|
| 3,392,620 A | 7/1968 | Thompson, Jr. | |
| 3,468,209 A * | 9/1969 | Barreto | G09B 15/06 84/376 K |
| 3,845,685 A * | 11/1974 | Coles | G10C 3/12 84/423 A |
| 3,865,004 A * | 2/1975 | Coles | G09B 15/08 192/134 |
| 4,227,436 A | 10/1980 | Kryzanowsky | |
| 4,885,969 A | 12/1989 | Chesters | |
| 4,903,572 A * | 2/1990 | Coles | G10G 1/02 84/442 |
| 4,926,734 A * | 5/1990 | Rickey | G10C 3/12 84/423 R |
| 5,254,008 A | 10/1993 | Dawson | |
| 5,404,788 A * | 4/1995 | Frix | G10C 3/12 84/423 R |
| 5,496,179 A | 3/1996 | Hoffman | |
| 5,546,843 A | 8/1996 | Degaard | |
| 5,685,724 A | 11/1997 | Bubar | |
| 5,962,800 A | 10/1999 | Johnson et al. | |
| 6,441,289 B1 | 8/2002 | Shinsky | |
| 6,566,593 B2 | 5/2003 | Pertchik | |
| 6,870,085 B2 | 3/2005 | MacCutcheon | |
| 6,881,887 B2 | 4/2005 | Berens | |
| 6,987,220 B2 | 1/2006 | Holcombe | |
| 7,241,945 B1 | 7/2007 | Egan | |
| 7,253,349 B1 * | 8/2007 | Saltsman | G10C 3/12 84/423 R |
| 7,674,965 B2 | 3/2010 | Mataele | |
| 8,039,722 B2 | 10/2011 | MacCoy | |
| 8,049,092 B1 * | 11/2011 | Vaughan | G09B 15/08 84/470 R |
| 8,686,268 B1 | 4/2014 | Young | |
| 8,884,147 B1 | 11/2014 | Stambaugh | |
| 2002/0029682 A1 | 3/2002 | Pertchik | |
| 2004/0255755 A1 | 12/2004 | Kestenbaum et al. | |
| 2006/0156904 A1 | 7/2006 | Gabert | |
| 2007/0089590 A1 | 4/2007 | Katou | |
| 2008/0072738 A1 * | 3/2008 | Plamondon | G10G 1/00 84/423 R |
| 2008/0087160 A1 | 4/2008 | Gabert | |
| 2009/0173212 A1 * | 7/2009 | Wold | G09B 15/02 84/483.2 |
| 2012/0272811 A1 | 11/2012 | Noddings | |
| 2014/0260898 A1 | 9/2014 | Bales et al. | |
| 2014/0305284 A1 | 10/2014 | Cosgrove | |
| 2015/0027298 A1 | 1/2015 | Simpson | |
| 2016/0125856 A1 * | 5/2016 | Bachand | G10G 1/04 84/609 |

OTHER PUBLICATIONS

"See Our Kids Piano Books"; http://pianoiseasy.com/showpage.cfm?page=see_our_books; Jul. 29, 2016; 9 pages.

"The Secret to Understanding the Layout of Piano Keys"; http://www.get-piano-lessons.com/layout-piano-keys.html; Jul. 29, 2016; 5 pages.

* cited by examiner

FIG. 15

MUSIC SYSTEM HAVING AN ASYMMETRICAL KEYBOARD LAYOUT AND NOTATION SYSTEM AND METHOD OF USING SAME

FIELD OF THE INVENTION

Embodiments are in the field of music. More particularly, embodiments disclosed herein relate to music systems having an asymmetrical keyboard layout and a notation system and methods of using same which, inter alia, foster a coherent music system that enables a user to learn, read, manipulate, and play music with great understanding and ease.

BACKGROUND OF THE INVENTION

There are several challenges that are associated with a traditional asymmetric keyboard (defined below, an exemplary portion of which is shown in FIG. 1), either alone or in combination with a traditional staff notation system. Some of these challenges arise from fundamental problems with the traditional asymmetric keyboard and traditional staff notation system such as:

There are 12 discreetly repeating keys/notes per octave, yet only 7 of these keys/notes are uniquely named (i.e., A-G, without the use of accidentals such as sharps (♯) and flats (♭)).

Note names for identical pitches can vary depending on the key (e.g., F♯=G♭).

The number of interval half steps between each of the 7 uniquely named notes A-G varies between 1 and 2.

Notes positions on the traditional staff vary depending on the clef sign and the octave, as well as whether accidentals are present. Entirely different pitches can therefore occupy the same line or space on the traditional staff.

Identical pitches can occupy a neighboring line or space depending on the note name and key signature.

Traditional key signatures do not uniquely identify the twelve modes of each key.

Simply looking at the white keys of a traditional asymmetric keyboard gives the false impression that they are evenly spaced notes with respect to steps.

All the aforementioned complications multiply upon their application to chords, harmony, transposition, etc.

Utilizing a different music system, U.S. Pat. No. 152,726, issued to Cramer, discloses a symmetrical keyboard, wherein each octave comprises consecutively ascending keys of consecutively alternating first (white) and second (black) colors, respectively, extending throughout the entirety of each octave. Within each octave, each of the white keys are the same size and depth-location as each other within the keyboard, and each of the smaller black keys are the same size and depth-location as each other within the keyboard (albeit longitudinally offset rearwardly/distally from proximal edges of the white keys). The spacing between each and every one of the smaller black keys is uniform throughout the entirety of the keyboard. In other words, the keyboard is symmetrical due to the uniform positioning of the black keys.

Cramer also discloses a staff notation system comprising consecutively ascending and alternating lines and spaces, wherein the consecutively ascending and alternating lines and spaces correspond to the consecutively ascending keys within each octave, respectively, within the symmetrical keyboard. Notes positioned on the lines correspond to white keys, and notes positioned within the spaces correspond to black keys. Cramer's numbering scheme of lines and spaces are counted incrementally (up and down) from a central note, or up and down from a point at either end of the keyboard, without resetting per octave. Cramer's symmetrical keyboard and staff notation system combination facilitates the reading of notes, as each note occupies a relative and regular position in each octave of lines. By adapting twelve places, i.e., six lines and six spaces, together with a symmetrical keyboard configuration of alternating colors, the use of accidentals such as sharps and flats is obviated. Cramer's keyboard employs the same notes (frequencies) as asymmetrical keyboards but some of the keys within each octave are shifted to produce the symmetrical keyboard configuration shown in Cramer's FIG. 1.

However, a significant problem with Cramer's symmetrical keyboard and staff notation system combination is that the staff notation system is designed to be employed only with Cramer's symmetrical keyboard. And since essentially all modern keyboards are traditional asymmetrical keyboards that employ an asymmetrical keyboard configuration, the lack of prevalence of symmetrical keyboards poses a significant hurdle for a keyboard musician to overcome.

Thus, it is desirable to provide a music system and method of using same that are able to overcome the above disadvantages.

Advantages of the present invention will become more fully apparent from the detailed description of the invention hereinbelow.

SUMMARY OF THE INVENTION

Embodiments are directed to a music system. The music system comprises an asymmetrical keyboard layout comprising at least one octave. Each octave comprises consecutively ascending keys of consecutively alternating first and second colors, respectively, extending throughout the entirety of each octave. The music system also comprises a notation system comprising a staff comprising consecutively ascending and alternating lines and spaces. The consecutively ascending and alternating lines and spaces correspond to the consecutively ascending keys within each octave, respectively. Notes positioned on the lines correspond to keys having the first color, and notes positioned substantially entirely within the spaces correspond to keys having the second color.

Embodiments are also directed to a method of using a music system. The method comprises providing an asymmetrical keyboard layout comprising at least one octave. Each octave comprises consecutively ascending keys of consecutively alternating first and second colors, respectively, extending throughout the entirety of each octave. The method also comprises providing a notation system comprising a staff comprising consecutively ascending and alternating lines and spaces. The consecutively ascending and alternating lines and spaces correspond to the consecutively ascending keys within each octave, respectively. Notes positioned on the lines correspond to keys having the first color, and notes positioned substantially entirely within the spaces correspond to keys having the second color.

Additional embodiments and additional features of embodiments for the music system and method of using the music system are described below and are hereby incorporated into this section.

BRIEF DESCRIPTION OF THE DRAWINGS

The detailed description will refer to the following drawings, wherein like reference numerals refer to like elements, and wherein:

FIG. 15 is a diagram illustrating an exemplary composition written in both the traditional notation system and the coherent notation system of the present invention, for comparison purposes.

DETAILED DESCRIPTION OF THE INVENTION

Figure 1:
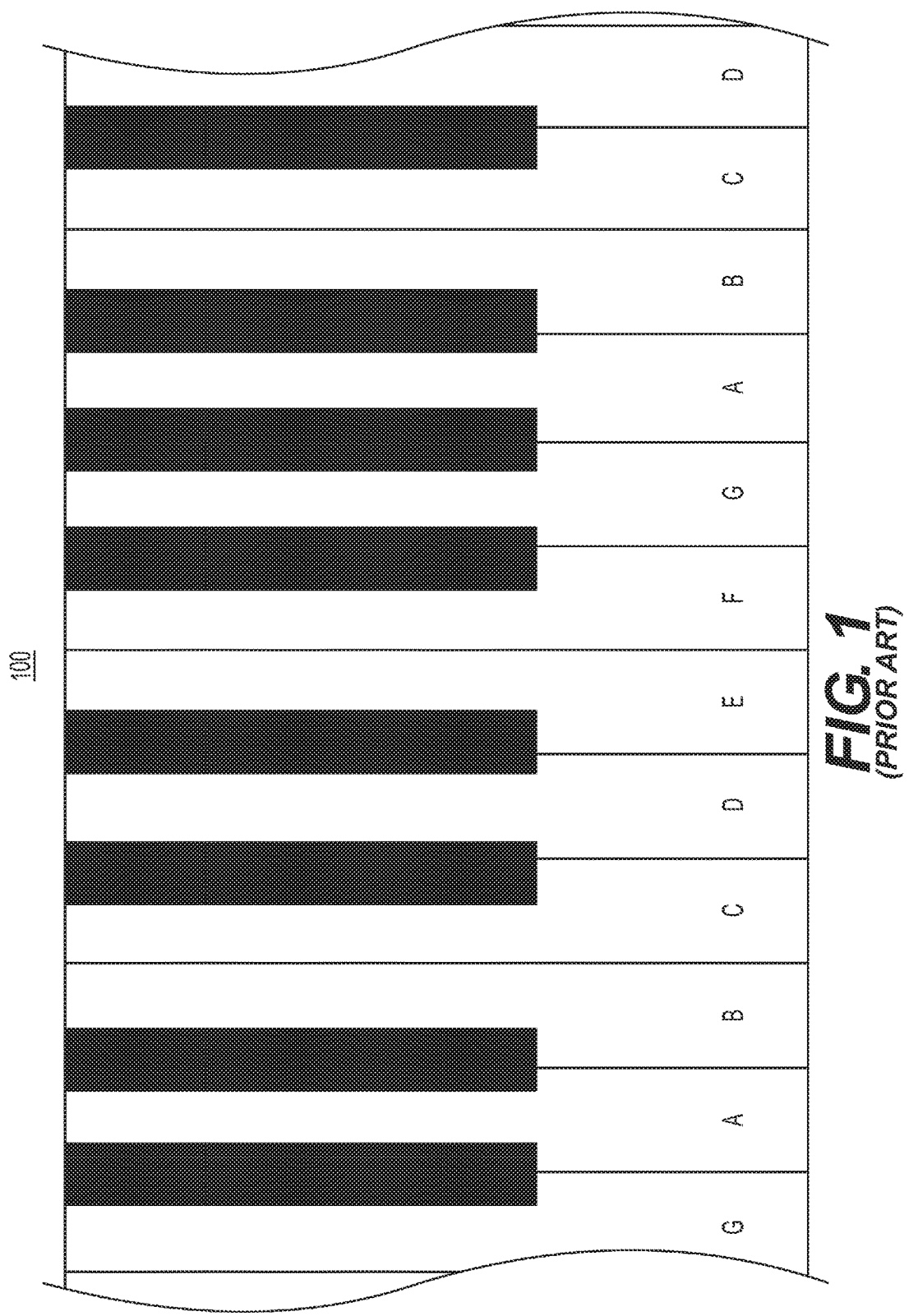
FIG. 1 is a diagram illustrating an exemplary portion of a traditional asymmetrical keyboard.

It is to be understood that the figures and descriptions of the present invention may have been simplified to illustrate elements that are relevant for a clear understanding of the present invention, while eliminating, for purposes of clarity, other elements found in a typical keyboard layout or notation system, or typical method of using a keyboard layout or notation system. Those of ordinary skill in the art will recognize that other elements may be desirable and/or required in order to implement the present invention. However, because such elements are well known in the art, and because they do not facilitate a better understanding of the present invention, a discussion of such elements is not provided herein. It is also to be understood that the drawings included herewith only provide diagrammatic representations of the presently preferred structures of the present invention and that structures falling within the scope of the present invention may include structures different than those shown in the drawings. Reference will now be made to the drawings wherein like structures are provided with like reference designations.

For purposes of this disclosure, the phrase "keyboard layout" refers to actual keyboard keys (referred to below as "keys"), or indicium or indicia positioned on (or above) or within at least some of the keyboard keys. The indicia or indicium may be in the form of one or more items selected from the group consisting of an overlay, sticker, label, tape, writing or marking (made by, for example, a writing/marking implement such as a pencil, pen, marker, highlighter, and combinations thereof), stamp, embosser, inscriber, scorer, moldings, attachments, illuminations, digital or other displays, and combinations thereof.

For purposes of this disclosure, the phrase "traditional (or standard/conventional) asymmetrical keyboard" refers to a keyboard comprising at least one octave. Each octave comprises seven white keys and five black keys. In this configuration, the black keys are smaller and offset rearwardly/distally from the larger white keys. The black keys may also be laterally narrower than the white keys. An exemplary portion of a traditional asymmetrical keyboard 100 is shown in FIG. 1. The figure shows an amount of keys that is between 1 and 2 octaves. As also shown, the keys are associated with seven note names A-G. The spacing between each of the smaller black keys is not uniform throughout the entirety of each octave. In other words, the traditional keyboard is asymmetrical due to the non-uniform positioning of the black keys.

Figure 2:
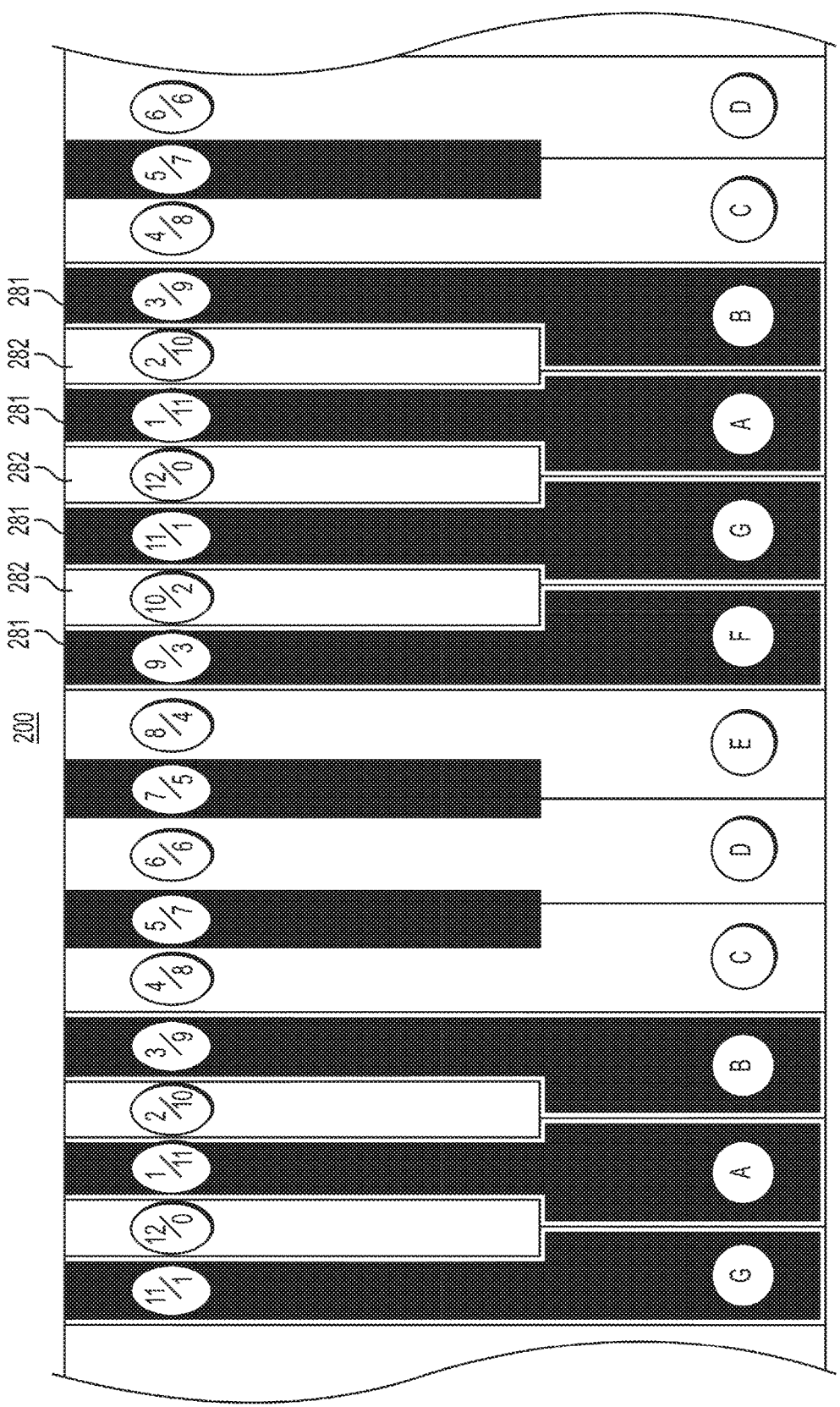
FIG. 2 is a diagram illustrating an exemplary portion of an asymmetrical keyboard layout, employing full-length overlays, in accordance with an embodiment of the present invention.

For purposes of this disclosure, the phrase "asymmetrical keyboard layout" refers to a keyboard layout comprising at least one octave. Each octave comprises six white keys and six black keys. In this configuration, the smaller keys are offset rearwardly/distally from the larger keys. The smaller keys may also be laterally narrower than the larger keys. An exemplary portion of an asymmetrical keyboard layout is shown in FIG. 2. The figure shows an amount of keys that is between 1 and 2 octaves. As also shown, the larger keys are associated with seven note names A-G. The spacing between each of the smaller keys is not uniform throughout the entirety of each octave. In other words, the keyboard layout is asymmetrical due to the non-uniform positioning of the smaller keys, regardless of their color.

FIG. 2, by way of example only, is a diagram illustrating an exemplary portion of an asymmetrical keyboard layout 200, employing full-length key color overlays on some keys (or the keys themselves may be of the particular colors), in accordance with an embodiment of the present invention. For each consecutively ascending key (i.e., for each half-step) of each octave, a note name indicium overlay is provided for each of the twelve keys thereby providing twelve distinct note name indicia 1/11-12/0 (note 12/0 may alternatively be replaced with 0/12). The note names are related to the notes A-G (as indicated with A-G indicia on the larger keys) and demonstrate the true whole-step and half step pattern of the, for example, C major scale. The twelve distinct note names are repeated via the note name indicia overlays for each key of each octave of the keyboard layout. And, within each octave, an overlay of consecutively alternating first and second colors 281, 282 (i.e., key color overlays) are respectively provided for each of only seven consecutive keys with note name indicia 9/3, 10/2, 11/1, 12/0, 1/11, 2/10, and 3/9, resulting in six black keys and six white keys per octave. The note name indicia overlay and key color overlay for a single key may be separate overlays or a single integral overlay. The keys with note name indicia 4/8, 5/7, 6/6, 7/5, and 8/4 may or may not have key color overlays since the color scheme of this portion of the asymmetrical keyboard layout is the same as that of the corresponding portion of a traditional asymmetrical keyboard. The note name indicia overlays provided on each key of each octave may be optional. Likewise, The note names A-G indicia overlays provided on each key of each octave may be optional. The note name indicia overlays and the A-G indicia overlays (which may both be positioned anywhere on the keys and be of any size) may be placed anywhere on the keys or alternatively be provided at a distance from the keys and not directly above each key. For example, they may be provided on a board or directly on a keyboard cover that is placed beyond or behind the keys, and may be provided individually for each key or on one board which spans the entire keyboard. As an alternative, the color scheme may be reversed from that shown in the figure. In other words, the black keys may alternatively be made white, while the white keys are made black. As a further alternative, the note name indicia may be shifted to be associated with a different start key. In other words, instead of the A key having note name indicium 1/11 associated with it as shown in the figure, the C key may have note name indicium 1/11 associated with it, with the remaining indicia respectively positioned, and repeated for each octave. Although overlays are discussed here, the keys themselves may be the colors as referenced and/or the keys themselves may incorporate the indicia integrally (see definition for "keyboard layout" above for other alternatives, which are hereby incorporated herein). Similarly, other embodiments may alternatively be configured as discussed in the definition for "keyboard layout" above.

Figure 3:
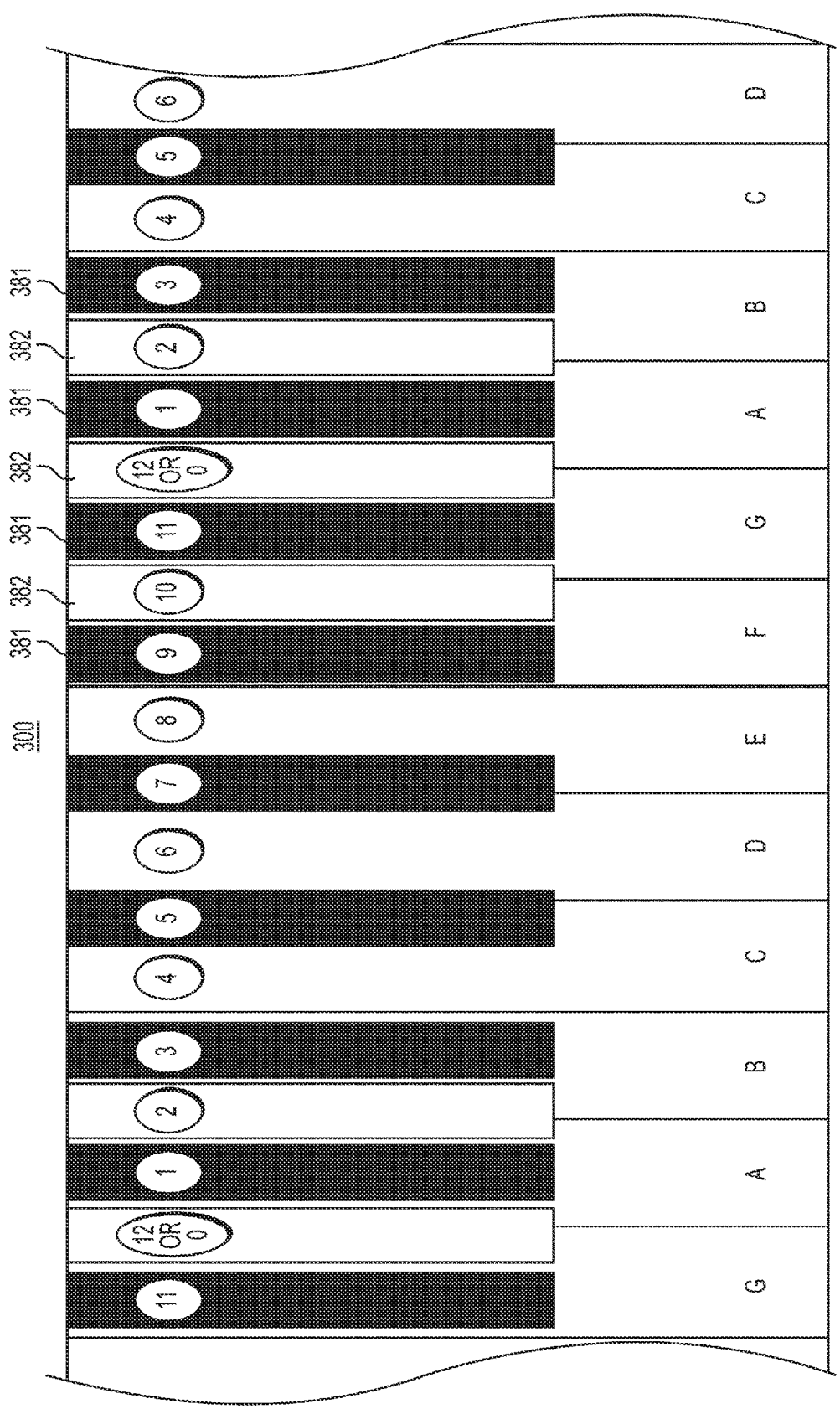
FIG. 3 is a diagram illustrating an exemplary portion of an asymmetrical keyboard layout, employing some partial-length overlays, in accordance with an embodiment of the present invention.

FIG. 3, by way of example only, is a diagram illustrating an exemplary portion of an asymmetrical keyboard layout 300, employing some partial-length key color overlays on some keys, in accordance with an embodiment of the present invention. FIG. 3 is similar to FIG. 2, except the note name indicia employs a single digit scheme (mentioned below), and the overlays of key color 381 on the larger keys with note name indicia 9, 11, 1, and 3 are of partial-length. The overlays of key color 382 on the smaller keys with note name indicia 10, 12, and 2 are of full-length. The partial-length key color overlays may be provided on the upper part of these particular keys, while optionally simultaneously having note names A-G indicia overlays on the lower part of the seven white keys. As mentioned above, another difference in FIG. 3 (from FIG. 2) is the alternative use of note name indicia 1-12 (note 12 may alternatively be replaced with 0), instead of note name indicia 1/11-12/0 used in FIG. 2. The partial-length key color overlay may be positioned anywhere on the keys and be of any size. Likewise, the note name indicia overlays and the A-G indicia overlays may be placed anywhere on the keys and be of any size. The full-length key color overlays may alternatively be partial length.

Figure 4:
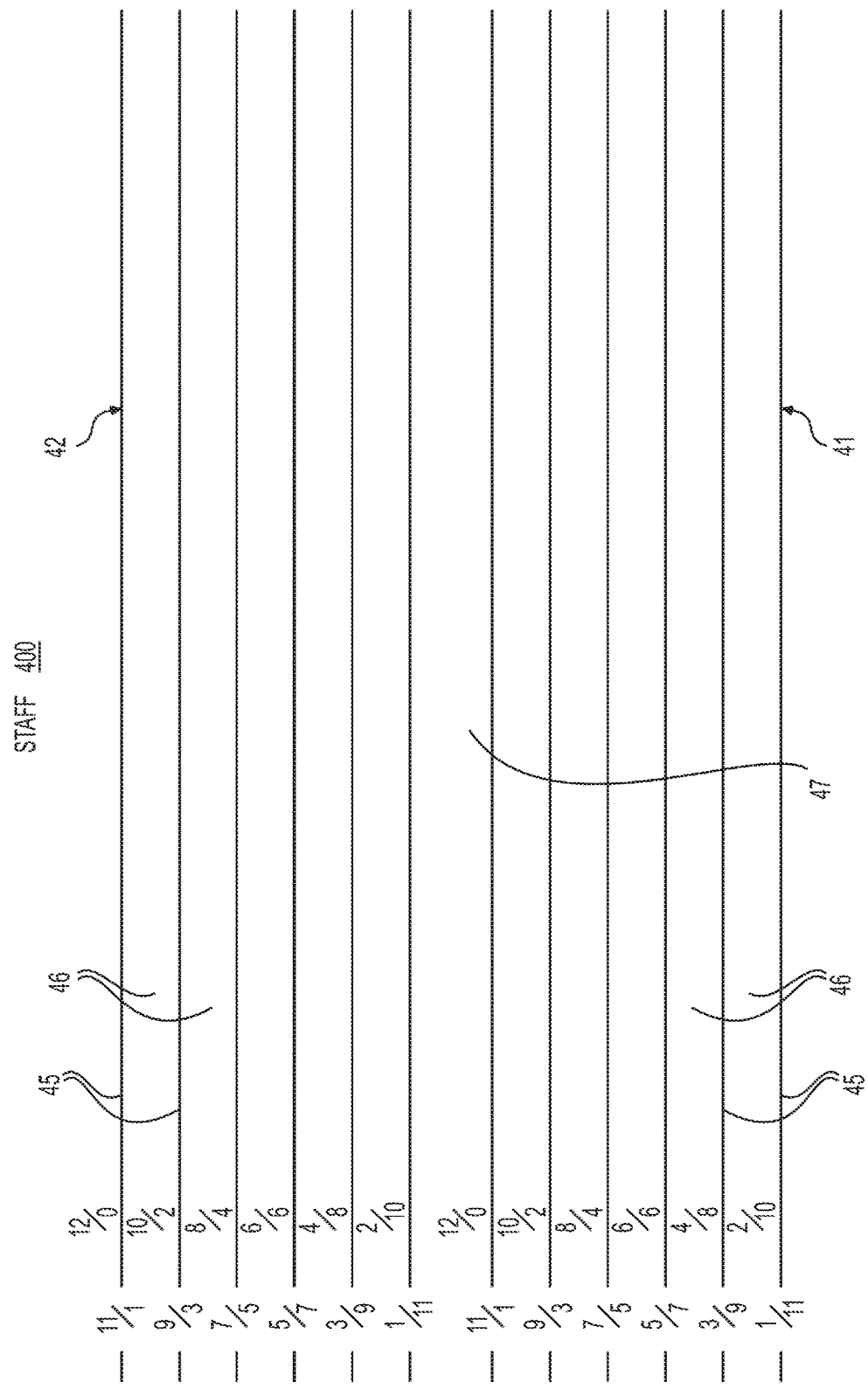
FIG. 4 is a diagram illustrating an exemplary twelve-line staff, to be employed in conjunction with an asymmetrical keyboard layout, in accordance with an embodiment of the present invention.

FIG. 4, by way of example only, is a diagram illustrating an exemplary twelve-line staff 400, to be employed in conjunction with an asymmetrical keyboard layout, in accordance with an embodiment of the present invention. The twelve-line staff 400 gives enough bandwidth to accommodate as much range as a traditional five-line staff), where the lower and upper six-line staff groups 41, 42 are each distinctly identified as home to only the notes as labeled (i.e., 1/11-12/0). Notes identified by note names (i.e., note names of the type comprising a singular digit such as a verse name shown in FIG. 3, or note names of the type comprising both verse names and inverse names per FIG. 2)) with odd numerals are consistently positioned on black staff lines 45, and coherently correspond to black keys on the asymmetric keyboard layout. Similarly, notes identified by note names (i.e., note names of the type comprising a singular digit such as a verse name shown in FIG. 3, or note names of the type comprising both verse names and inverse names per FIG. 2)) with even numerals are consistently positioned substantially within the spaces 46 between staff lines, and coherently correspond to white keys on the asymmetric keyboard layout.

As also shown in FIG. 4, the space 47 between the lower and upper six-line staff groups 41, 42 is larger than a height of each of the spaces 46 within each of the six-line staff groups. The larger space 47 preferably accommodates a single note such as note 12/0. The larger space 47 also serves to visually break the twelve lines into conveniently readable subsets (groups 41, 42). The larger space 47 should also not be too large so as to create the false impression that more than one note resides in that location. Alternatively, the space 47 may be the same height as each of the spaces 46 within each of the six-line staff groups.

As commonly used, octave or ottava signs (8va or 8ve) are employed above or below traditional staves to indicate that the passage covered is to be played at a particular octave higher or lower than the written note. However, in an embodiment, instead of using the octave or ottava signs (which still may be employed), they may be replaced with signs such as +12_____| or +12-----|. The lines in "_____|" and "------|" signify the entire amount of the notes to be played an octave higher or lower, i.e., the start and stop points of playing higher or lower. The "−12" would be the way an indication of the note being an octave lower would be written. The use of +12 and −12 signs are especially meaningful and well-suited to the twelve-line staff of the present invention because the signs corresponding directly with the present invention's note name and interval name schemes (i.e., which are twelve-based) and because each of the twelve notes that make up each octave occupies a discreet position on the twelve-line staff of the present invention.

Figure 5:
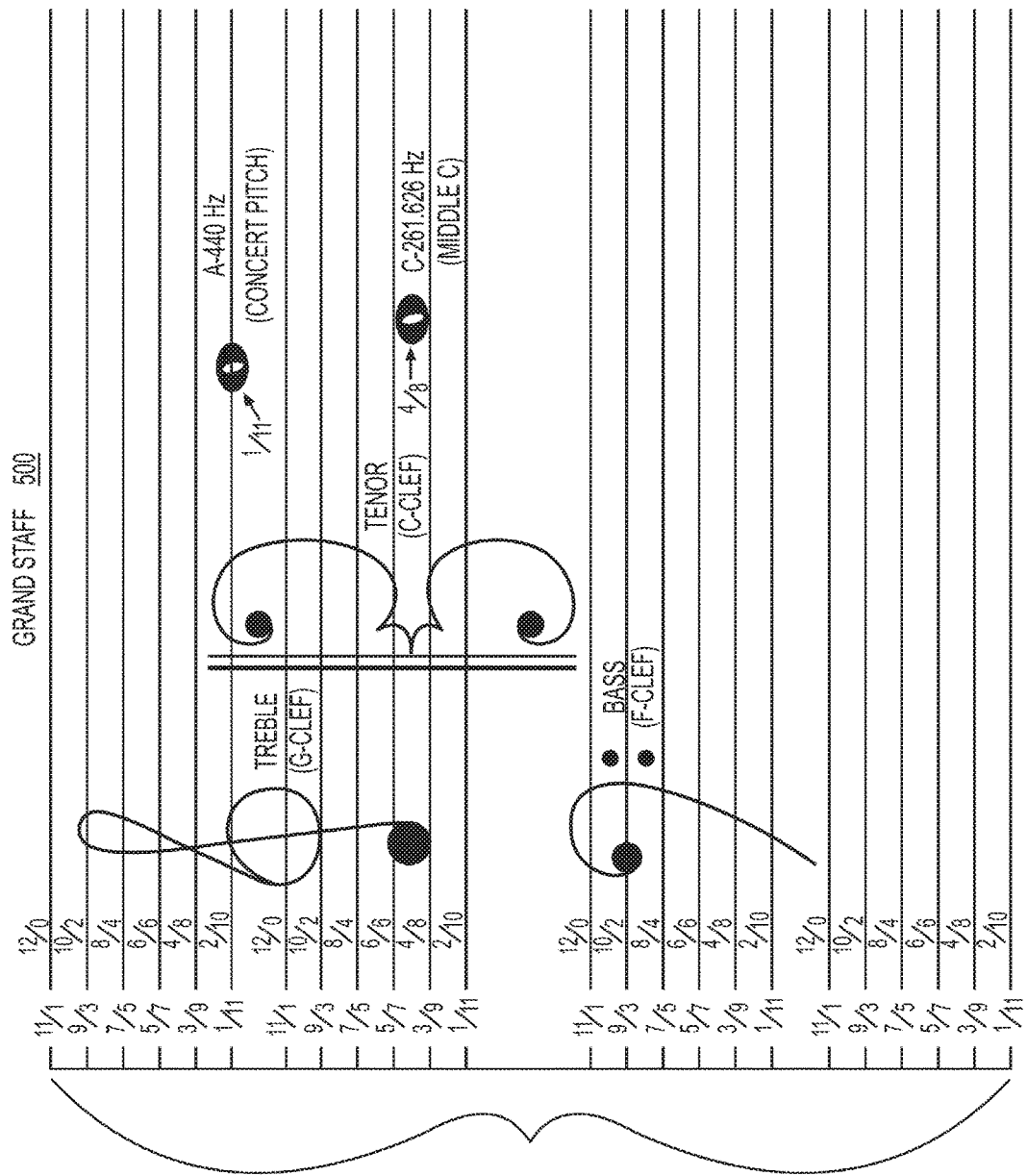
FIG. 5 is a diagram illustrating an exemplary grand staff, to be employed in conjunction with an asymmetrical keyboard layout, in accordance with an embodiment of the present invention.

FIG. 5, by way of example only, is a diagram illustrating an exemplary grand staff 500, to be employed in conjunction with an asymmetrical keyboard layout, in accordance with an embodiment of the present invention.

The single twelve-line staff 400 (FIG. 4) may accept smaller ledger lines above the top (12th) line and below the bottom (1st) line, but not within the larger space 47 (between the 6th and 7th lines). The same convention applies to a grand staff 500 (FIG. 5) where two single twelve-line staves are joined for, for example, a bass and treble (or tenor) clef arrangement. Alternatively, the grand staff 500 may comprise additional staff groups.

As shown in FIG. 5, the treble clef (G-clef) sign may be positioned so the large middle curl encircles the 11/1 (or G) note. In this clef, the seventh line represents note 1/11 (at 440 Hz) which is concert pitch. The bottom ball of this clef sign occupies the same second space as note name 4/8 (at 261.626 Hz) which is middle C. The tenor clef (C-Clef) sign centers on note 4/8 (middle C). The bass clef (F-Clef) sign has the dots above and below the eleventh line which represents note 9/3 (the first F below middle C). Any or all of these clefs may be alternatively positioned.

Figure 6:
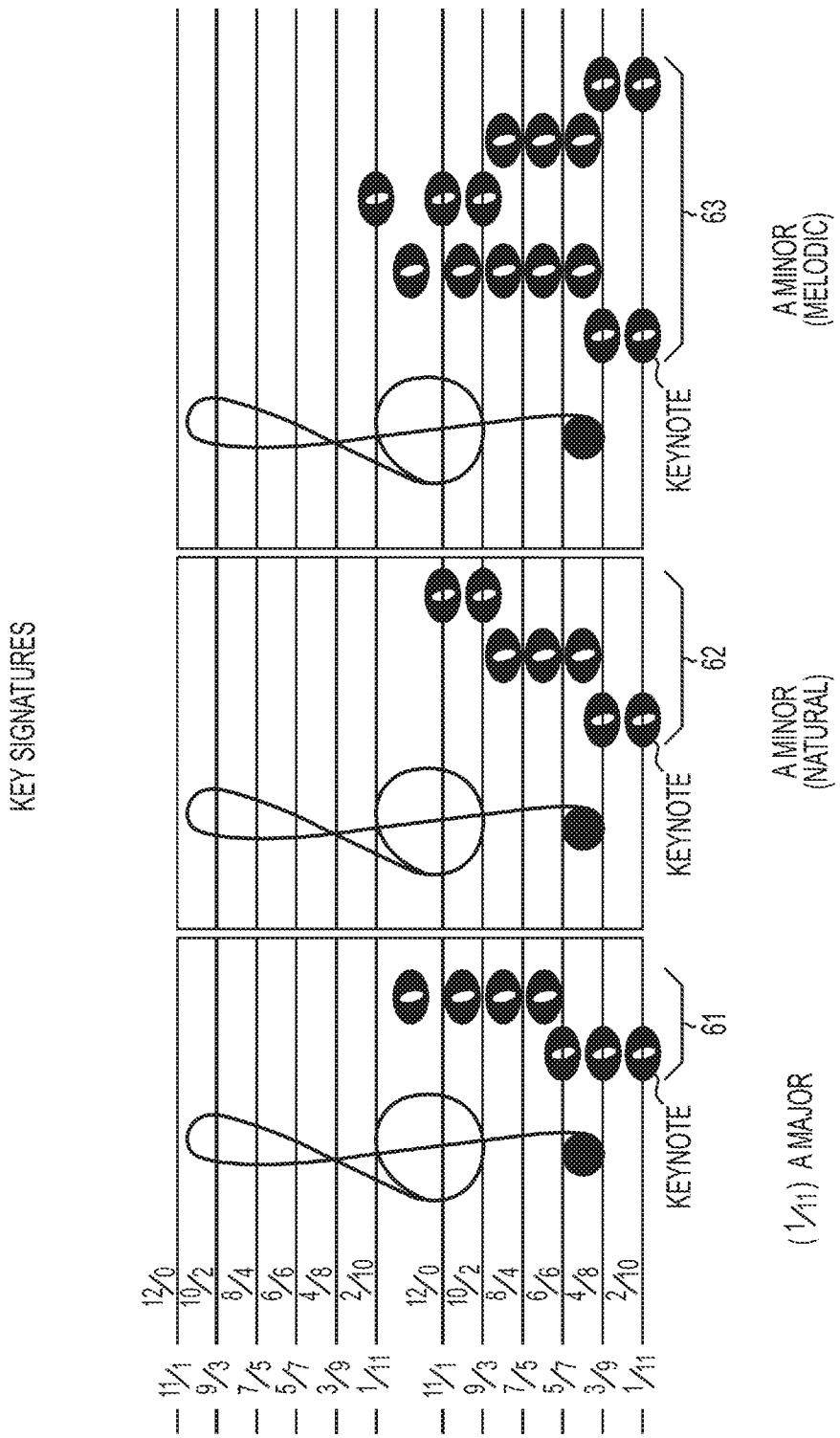
FIG. 6 is a diagram illustrating three exemplary twelve-line staves for treble clef illustrating major and minor scale-based key signatures, to be employed in conjunction with an asymmetrical keyboard layout, in accordance with an embodiment of the present invention.
Figure 7:
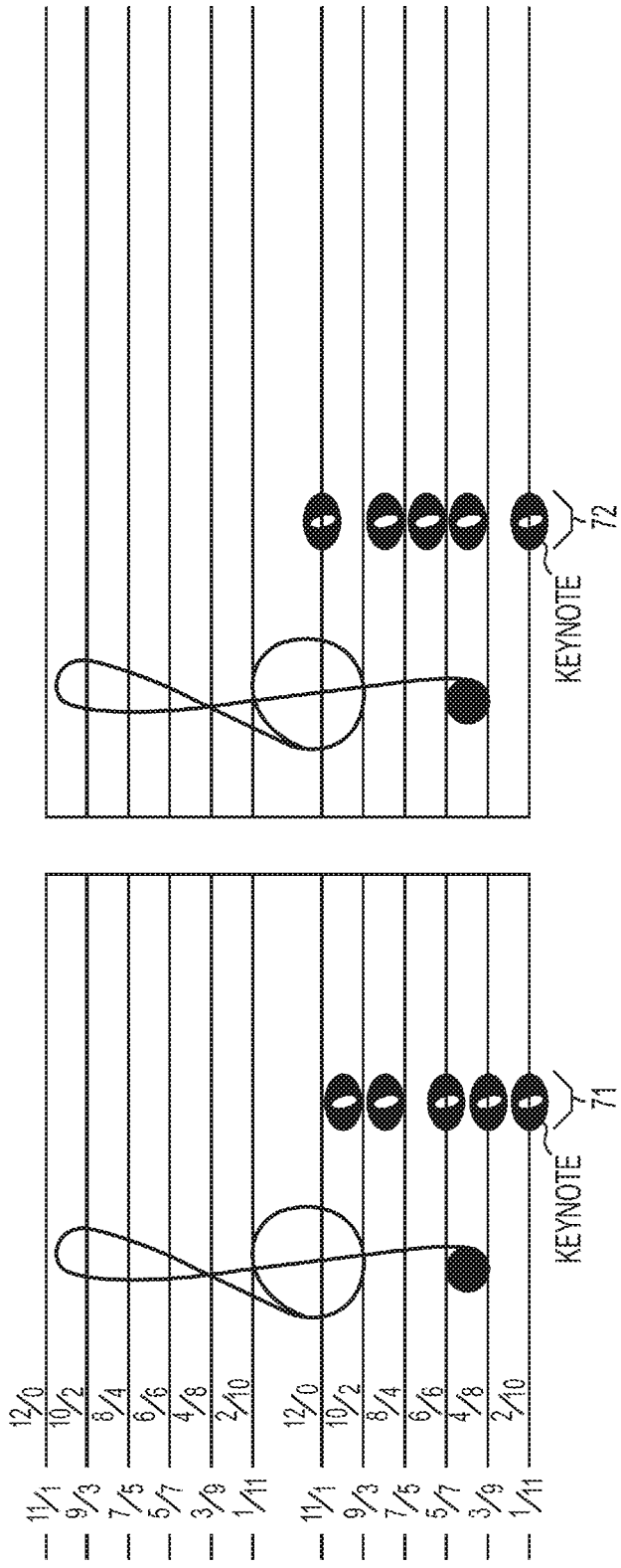
FIG. 7 is a diagram illustrating two exemplary twelve-line staves for treble clef illustrating major blues and minor blues scale-based key signatures, to be employed in conjunction with an asymmetrical keyboard layout, in accordance with an embodiment of the present invention.

FIG. 6, by way of examples only, is a diagram illustrating three exemplary twelve-line staves for treble clef illustrating major and minor scale-based key signatures 61, 62, 63, to be employed in conjunction with an asymmetrical keyboard layout, in accordance with an embodiment of the present invention. Key signatures are denoted by presenting the actual scale (preferably positioned after the clef sign and before the time signature (not shown)). Beginning with the keynote of the scale at the bottom. In this manner the pattern of any particular scale (e.g., jazz or blues), mode (e.g., Aeolian or Mixolydian), or nature (e.g., melodic or harmonic minor) is at least distinctly identifiable and easily transposable. As shown by key signatures 61, 62, a key signature scale may be provided in one direction. This can signify that the scale is identical in both upward and downward directions (which is the case for most scales). Alternatively, as shown by key signature 63, a key signature scale may be provided in two directions. This signifies that the scale is different in the upward direction than the downward direction (for example, when signifying a melodic minor scale). In either scenario, key signatures 61, 62, 63 all identify each and every note of the key signature scale, and accounts for changes in scale notes dependent on scale direction. As additional examples of scale-based key signatures, FIG. 7 is a diagram illustrating two exemplary twelve-line staves for treble clef illustrating major blues and minor blues scale-based key signatures 71, 72, to be employed in conjunction with an asymmetrical keyboard layout, in accordance with an embodiment of the present invention.

The key signatures of the present invention may be represented immediately after the clef sign and before the time signature. Alternatively, the key signatures may be located elsewhere.

Since each note occupies a discrete line or space on the twelve-line staff of the present invention, there are no accidentals such as sharps or flats. Therefore, the key signature of the present invention is indicated by the actual scale notes beginning with the keynote at the bottom and working its way up the scale (and back down in the case of scales like the Melodic Minor scale where the downward direction of a scale contains different notes than the upward direction). In this way, every aspect of the scale is indicated and therefore realized, i.e. scale, type, mode, special natures (such as the Natural, Harmonic, or Melodic scales), and the unique patterns of their half steps. Alternatively, other key signature schemes may be employed with the present invention such as actual notes of a chord, letters representing a chord name such as "G", or a combination of letters with chord type for specific chords such as "G Major", etc.

Figure 8:
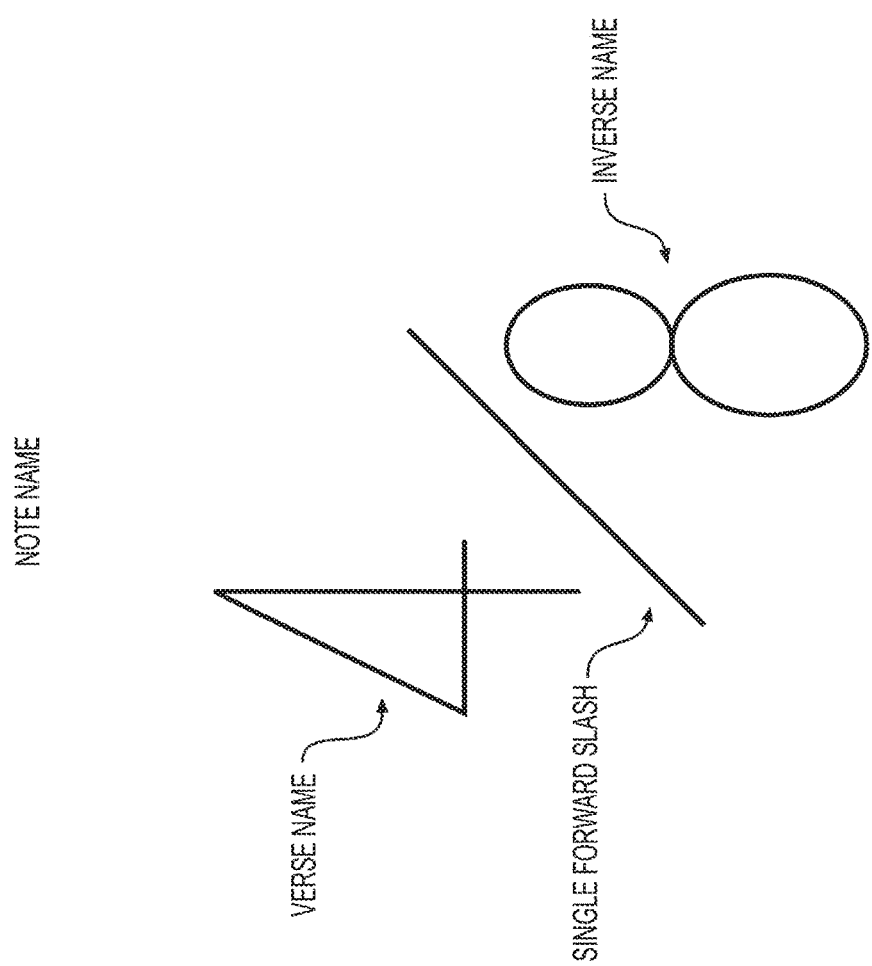
FIG. 8 is a diagram illustrating an exemplary key/note name comprising an indicium comprising a verse name and an inverse name separated by a single forward slash, to be employed in conjunction with an asymmetrical keyboard layout, in accordance with an embodiment of the present invention.

FIG. 8, by way of example only, is a diagram illustrating an exemplary key/note name comprising an indicium comprising a verse name (in, for example, a numerator position) and an inverse name (in, for example, a denominator position) separated by a single forward slash, to be employed in conjunction with an asymmetrical keyboard layout, in accordance with an embodiment of the present invention. The verse name numeral and inverse name numeral always add up to 12. The orientation of a note name may vary. For example, a note name may be vertical such as $\frac{4}{8}$ (not shown in FIG. 8), diagonal such as 4/8 (as shown in FIG. 8), or horizontal such as 4/8 (not shown in FIG. 8). The single forward slash may be replaced by any other separator such as a tilde (~).

Figure 9:
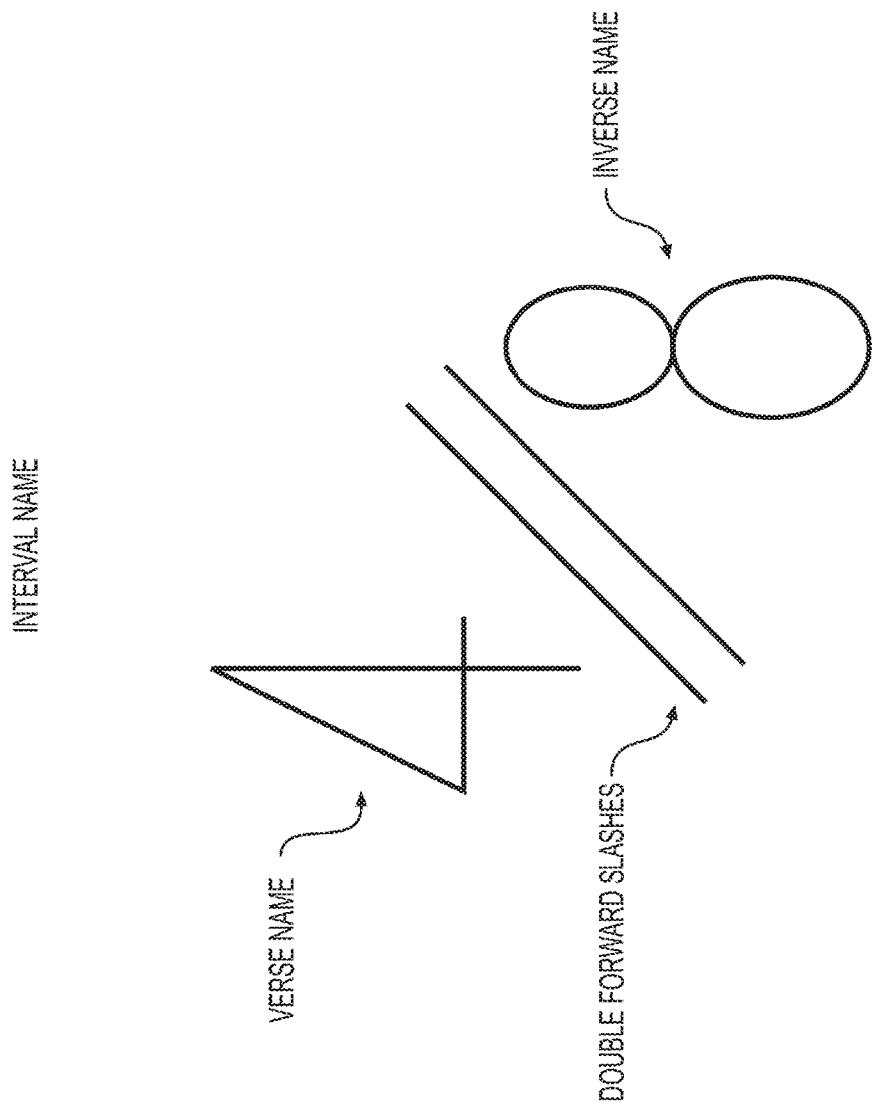
FIG. 9 is a diagram illustrating an exemplary interval name comprising an indicium comprising a verse name and an inverse name separated by double forward slashes, to be employed in conjunction with an asymmetrical keyboard layout, in accordance with an embodiment of the present invention.

FIG. 9, by way of example only, is a diagram illustrating an exemplary interval name comprising an indicium comprising a verse name (in, for example, a numerator position) and an inverse name (in, for example, a denominator position) separated by double forward slashes, to be employed in conjunction with an asymmetrical keyboard layout, in accordance with an embodiment of the present invention. The verse name numeral and inverse name numeral always add up to 12. The orientation of an interval name may vary. For example, an interval name may be vertical such as $\frac{4}{8}$ (not shown in FIG. 9), diagonal (as shown in FIG. 9), or horizontal such as 4//8 (not shown in FIG. 9). The double forward slashes may be replaced by any other separator(s) such as an equivalent symbol (≈).

Figure 10:
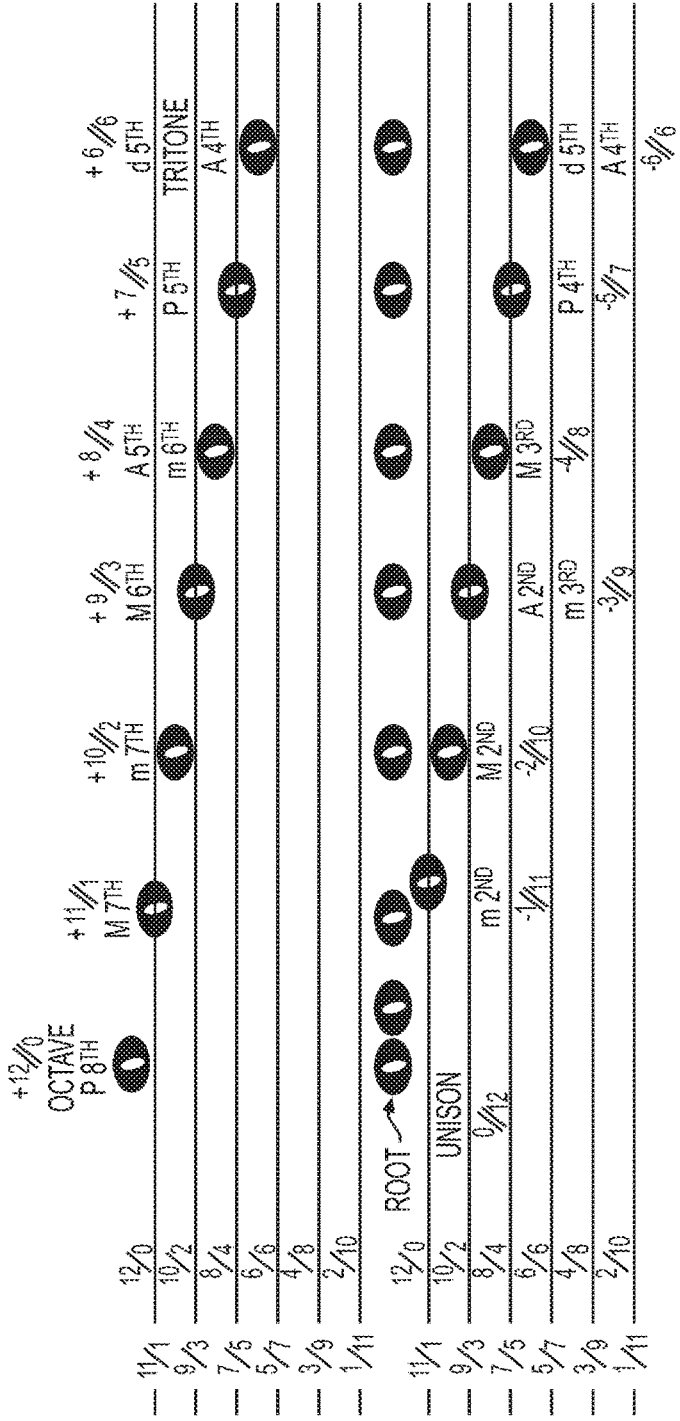
FIGS. 10 and 11 are diagrams illustrating exemplary intervals above and below a root note, to be employed in conjunction with an asymmetrical keyboard layout, in accordance with an embodiment of the present invention.
Figure 11:
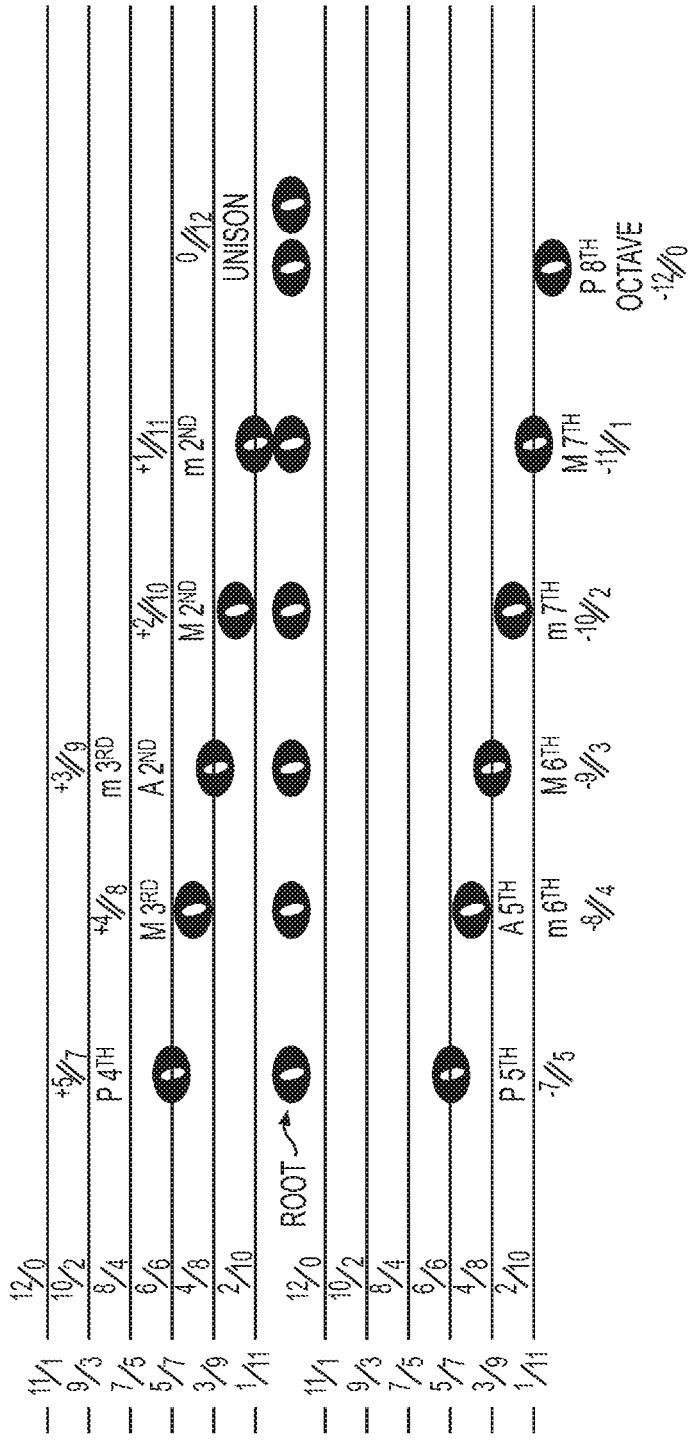

FIGS. 10 and 11, by way of examples only, are diagrams illustrating exemplary intervals above and below a root note, to be employed in conjunction with an asymmetrical keyboard layout, in accordance with an embodiment of the present invention.

The verse name numeral of an interval name also represents the number of half-steps that are required to reach it above (with a + sign) or below (with a − sign) any given root note.

Likewise, the inverse name numeral of an interval name represents the verse name numeral of the interval's inversion. For example, a perfect 5th is indicated via interval name 7//5, while the inverted interval of a perfect 5th is a perfect 4th. A perfect 4th is indicated via interval name 5//7. By knowing a particular interval using one interval name, a user would conveniently, quickly, and easily ascertain the other related inverted interval.

Figure 12:
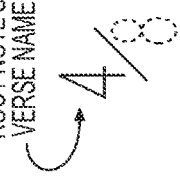
FIG. 12 is a diagram illustrating exemplary interval note determinations employing: addition of a root note's verse name and an interval name's verse name; addition of a root note's inverse name and an interval name's inverse name; subtraction of an interval name's verse name from a root note's verse name; and subtraction of an interval name's inverse name from a root note's inverse name, to be employed in conjunction with an asymmetrical keyboard layout, in accordance with an embodiment of the present invention.

FIG. 12, by way of examples only, is a diagram illustrating exemplary interval note determinations employing: addition of a root note's verse name and an interval name's verse name; addition of a root note's inverse name and an interval name's inverse name; subtraction of an interval name's verse name from a root note's verse name; and subtraction of an interval name's inverse name from a root note's inverse name, to be employed in conjunction with an asymmetrical keyboard layout, in accordance with an embodiment of the present invention.

To determine the note of any interval above a root note, add the root note's (or root note name's) verse name to the interval's (or interval name's) verse name. The sum will be the interval note's verse name. However, if the sum is larger than 12, then add the root note's inverse name to the interval's inverse name. The sum will be the interval note's inverse name.

To determine the note of any interval below a root note, subtract the interval's (or interval name's) verse name from the root note's (or root note name's) verse name. However, if the difference is less than zero, then subtract the interval's inverse name from the root note's inverse name. The difference will be the interval note's inverse name.

Of course, the octave or unison of any root note is the same as the root note. No determination is needed. This may occur, for example, depending on whether interval 12//0 or 0//12 is employed.

Figure 13:
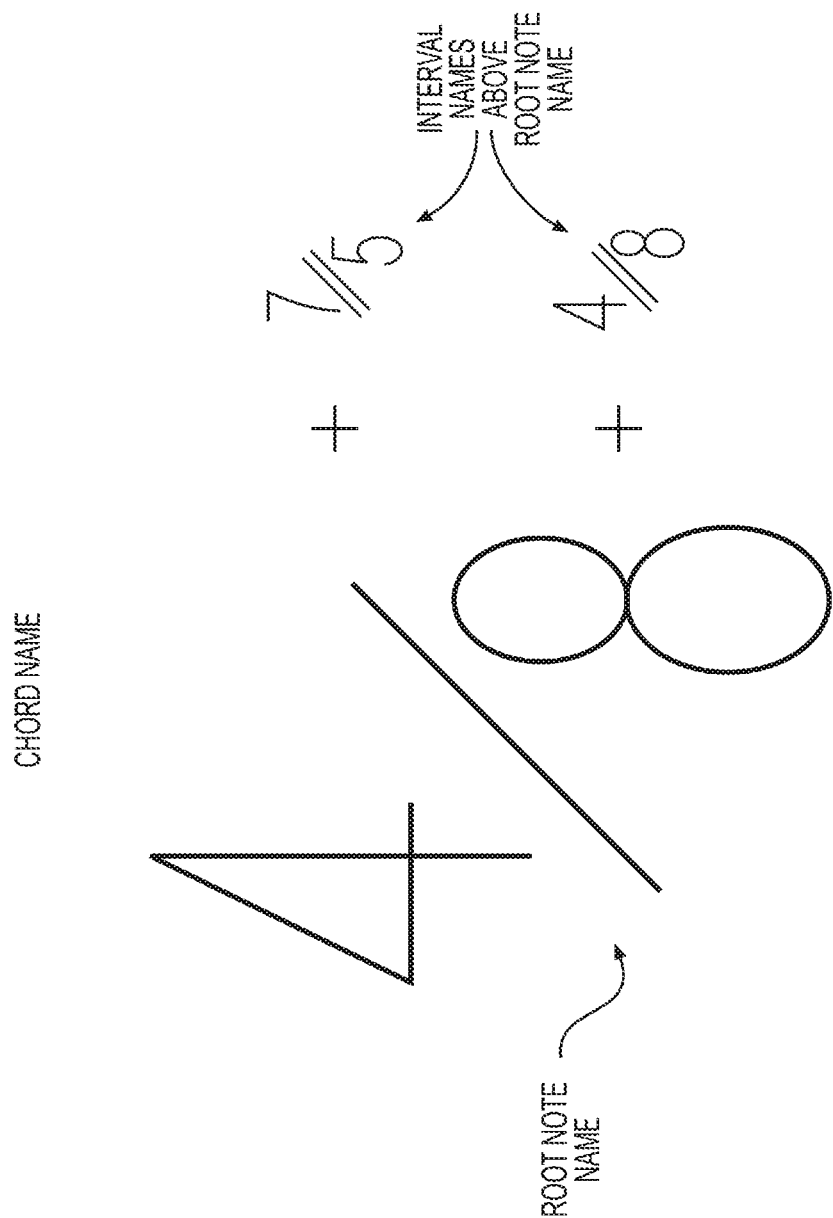
FIG. 13 is a diagram illustrating an exemplary chord name comprising a root note name and interval names of each other note comprising the chord, to be employed in conjunction with an asymmetrical keyboard layout, in accordance with an embodiment of the present invention.

FIG. 13, by way of example only, is a diagram illustrating an exemplary chord name comprising a root note name and interval names of each other note comprising the chord, to be employed in conjunction with an asymmetrical keyboard layout, in accordance with an embodiment of the present invention. Chords have a chord name composed of the root note (or root note name), followed by all the interval names of each other note comprising the chord. Each interval name is preceded by a plus or minus sign to indicate whether the interval is above or below the root note. In this way, first, second, and even third or more inversions may be realized. If, for example, a chord has four notes such as a Major 7th chord, then the inversion definition may simply refer to how many times the root note is moved up from the bottom keynote position and changes whether the chord sounds "open" or "closed". Compound chords could have more than 4 inversions.

Figure 14:
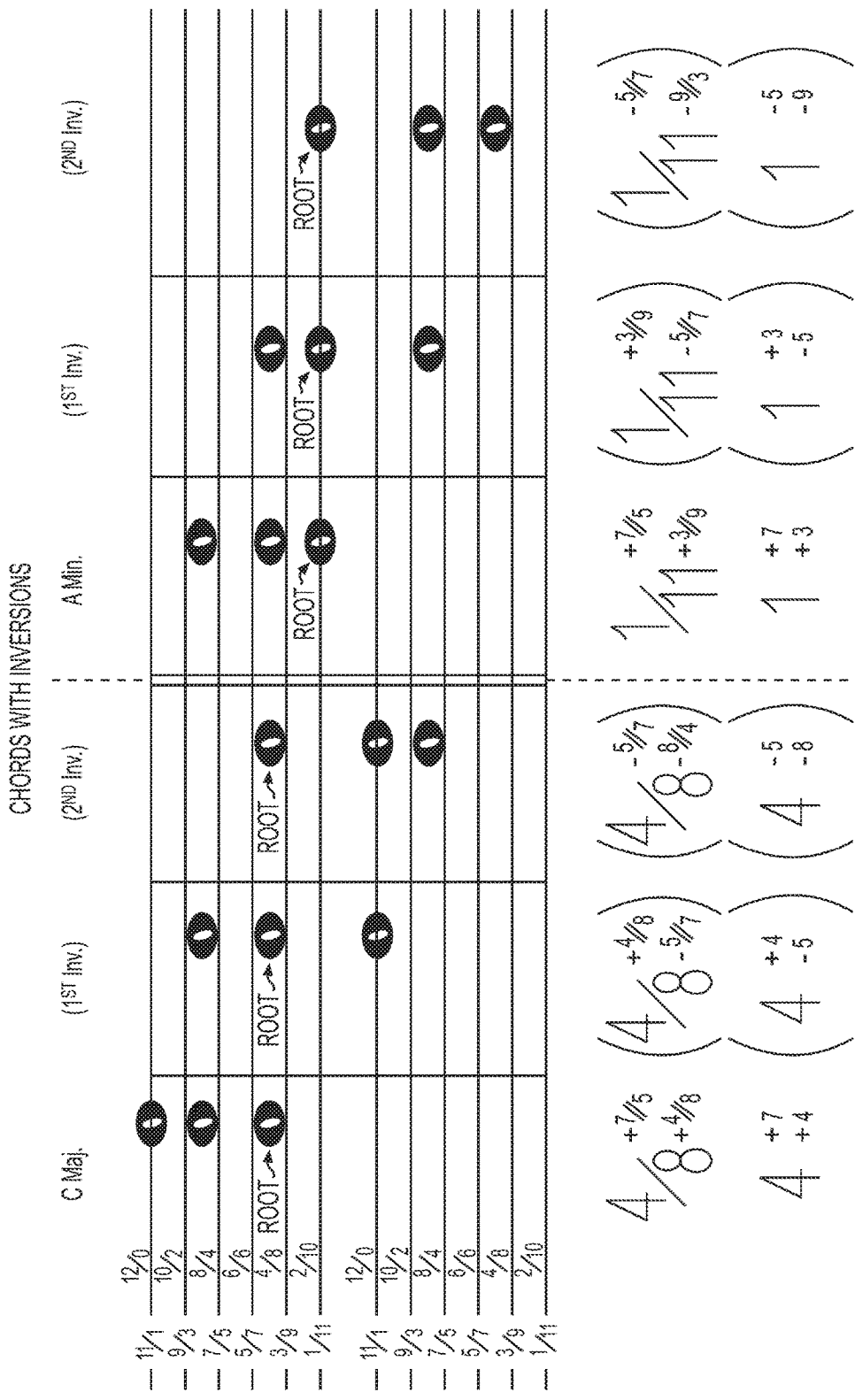
FIG. 14 is a diagram illustrating exemplary major and minor chords, along with first and second chord inversions thereof, to be employed in conjunction with an asymmetrical keyboard layout, in accordance with an embodiment of the present invention.

FIG. 14, by way of examples only, is a diagram illustrating exemplary major and minor chords, along with first and second chord inversions thereof, to be employed in conjunction with an asymmetrical keyboard layout, in accordance with an embodiment of the present invention.

FIG. 15 is a diagram illustrating an exemplary composition 1500 written in both the traditional notation system and the coherent notation system of the present invention, for comparison purposes. The exemplary composition 1500 is entitled "The Invitation (Intro)" and comprises two lines of a grand staff of the traditional notation system positioned respectively above two lines of a grand staff of the coherent notation system of the present invention. The figure shows, inter alia, the key signature for the traditional notation system (represented by three ♭-sign notes) confusingly corresponds to either E♭ Major or C minor, whereas the key signature for the coherent notation system of the present invention (represented by notes of a scale) specifically and accurately corresponds to C Harmonic minor.

Embodiments are directed to a music system. The music system comprises an asymmetrical keyboard layout 200, 300 comprising at least one octave. Each octave comprises consecutively ascending keys of consecutively alternating first and second colors, respectively, extending throughout the entirety of each octave. The music system also comprises a notation system comprising a staff 400 comprising consecutively ascending and alternating lines 45 and spaces 46. The consecutively ascending and alternating lines 45 and spaces 46 correspond to the consecutively ascending keys within each octave, respectively. Notes positioned on the lines 45 correspond to keys having the first color, and notes positioned substantially entirely within the spaces 46 correspond to keys having the second color.

In an embodiment, the notation system does not employ sharps or flats.

In an embodiment, the first color is black and the second color is white.

In an embodiment, the staff 400 forms at least one group (41 and/or 42), and each group comprises six of the lines 45.

In an embodiment, the staff 400 forms two groups 41, 42, and each group comprises six of the lines 45. The groups are separated from each other a distance (via space 47) greater than a height of each of the spaces 46.

In an embodiment, the notation system may further comprise a key signature 61, 62, 63, 71, 72 in a form of a scale comprising a plurality of notes on the staff identifying the scale. The plurality of notes on the staff comprising the scale may include all ascending notes of the scale (i.e., key signatures 61, 62, 71, 72). Alternatively, in another embodiment, the plurality of notes on the staff comprising the scale may include all ascending notes of the scale followed by all descending notes of the scale (i.e., key signature 63). In an embodiment, the notation system may alternatively further comprise a key signature in a form of a chord comprising a plurality of notes on the staff identifying the chord.

In an embodiment, the consecutively ascending keys within each octave are associated with consecutively ascending indicia 1, 2, 3, 4, 5, 6, 7, 8, 9, 10, 11, and 12 or 0, respectively. A bottom line of the staff corresponds to the key associated with the indicium 1. Alternatively, the bottom line of the staff may correspond to a key associated with a different indicium. In another embodiment, the key of "A" within each octave is associated with the indicium 1. Alternatively, the indicium 1 may be associated with a different key. In another embodiment, a chord name is identified by a combination of: a root note indicium selected from one of the consecutively ascending indicia; and an interval indicium of each other note comprising the chord. In another embodiment, a chord name is identified by a combination of: a root note indicium selected from one of the consecutively ascending indicia; and an interval indicium of each other note comprising the chord; wherein each interval indicium above the root note indicium is selected from the group consisting of +1, +2, +3, +4, +5, +6, +7, +8, +9, +10, +11, and +12; and wherein each interval indicium below the root note indicium is selected from the group consisting of −1, −2, −3, −4, −5, −6, −7, −8, −9, −10, 31 11, and −12. In another embodiment, a distance between any two of the consecutively ascending keys is associated with an interval name comprising a verse name and an inverse name separated by double forward slashes, wherein a chord name is identified by a combination of: a root note indicium selected from one of the consecutively ascending indicia; and a plurality of verse names or a plurality of inverse names, of each other note comprising the chord.

In an embodiment, the consecutively ascending keys within each octave are associated with consecutively ascending indicia 1/11, 2/10, 3/9, 4/8, 5/7, 6/6, 7/5, 8/4, 9/3, 10/2, 11/1, and 12/0 or 0/12, respectively. A bottom line of the staff corresponds to the key associated with the indicium 1/11. Alternatively, the bottom line of the staff may correspond to the key associated with a different indicium. In another embodiment, the key of "A" within each octave is associated with the indicium 1/11. Alternatively, the indicium 1/11 may be associated with a different key. In another embodiment, each of the consecutively ascending indicia defines a note name comprising a verse name and an inverse name separated by a single forward slash. In another embodiment, a chord name is identified by a combination of: a root note indicium selected from one of the consecutively ascending indicia; and an interval indicium of each other note comprising the chord.

In another embodiment, a chord name is identified by a combination of: a root note indicium selected from one of the consecutively ascending indicia; and an interval indicium of each other note comprising the chord; wherein each interval indicium above the root note indicium is selected from the group consisting of +1//11, +2//10, +3//9, +4//8, +5//7, +6//6, +7//5, +8//4, +9//3, +10//2, +11//1, and +12//0; and wherein each interval indicium below the root note indicium is selected from the group consisting of −1//11, −2//10, −3//9, −4//8, −5//7, −6//6, −7//5, −8//4, −9//3, −10//2, −11//1, and −12//0. In another embodiment, a distance between any two of the consecutively ascending keys is associated with an interval name comprising a verse name and an inverse name separated by double forward slashes, wherein a chord name is identified by a combination of: a root note indicium selected from one of the consecutively ascending indicia; and a plurality of verse names or a plurality of inverse names, of each other note comprising the chord.

In an embodiment, a distance between any two of the consecutively ascending keys is associated with an interval name comprising a verse name and an inverse name separated by double forward slashes, wherein the interval name corresponds to a number of half steps. The interval name may be selected from the group consisting of 1//11, 2//10, 3/19, 4//8, 5//7, 6/16, 7//5, 8//4, 9/13, 10//2, 11//1, and 12//0 or 0//12.

In an embodiment, a distance between any two of the consecutively ascending keys is associated with an interval name selected from the group consisting of 1, 2, 3, 4, 5, 6, 7, 8, 9, 10, 11, and 12, wherein the interval name corresponds to a number of half steps.

In an embodiment, a chord name is identified by a combination of: a root note indicium; and an interval indicium of each other note comprising the chord; wherein each interval indicium above the root note indicium is selected from the group consisting of +1, +2, +3, +4, +5, +6, +7, +8, +9, +10, +11, and +12; and wherein each interval indicium below the root note indicium is selected from the group consisting of −1, 31 2, −3, −4, −5, −6, −7, −8, −9, −10, −11, and −12.

In an embodiment, a chord name is identified by a combination of: a root note indicium; and an interval indicium of each other note comprising the chord; wherein each interval indicium above the root note indicium is selected from the group consisting of +1//11, +2//10, +3//9, +4//8, +5//7, +6/16, +7//5, +8//4, +9//3, +10//2, +11//1, and +12//0; and wherein each interval indicium below the root note indicium is selected from the group consisting of −1//11, −2//10, −3//9, −4//8, −5//7, 31 61/6, 31 7//5, 31 8//4, −9//3, −10//2, −11//1, and −12//0.

Figure 16:
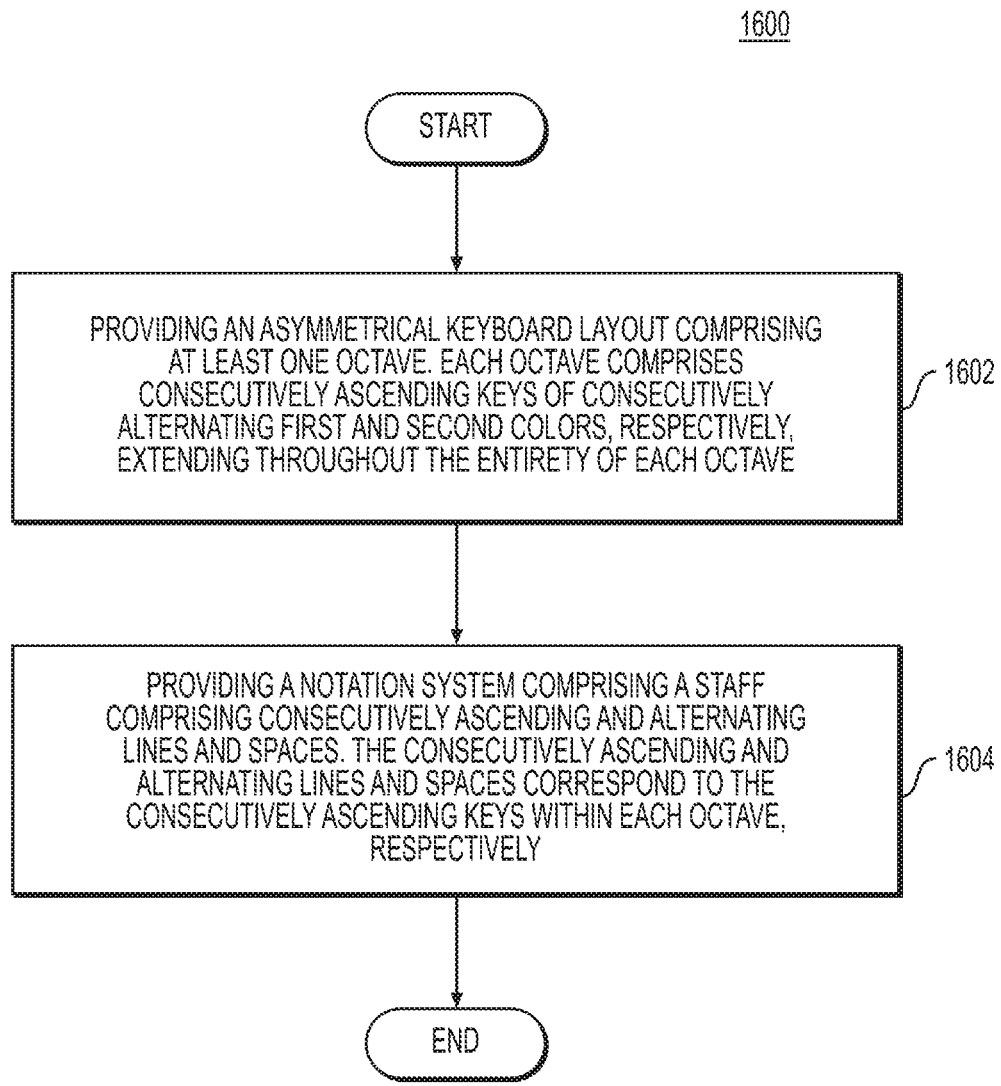
FIG. 16 is a flowchart illustrating an embodiment of a method of using a music system.

Embodiments are also directed to a method of using a music system. FIG. 16, by way of example only, is a flowchart illustrating an embodiment of a method 1600 of using a music system. The method 1600 comprises providing an asymmetrical keyboard layout comprising at least one octave. Each octave comprises consecutively ascending keys of consecutively alternating first and second colors, respectively, extending throughout the entirety of each octave (block 1602). The method 1600 also comprises providing a notation system comprising a staff comprising consecutively ascending and alternating lines and spaces. The consecutively ascending and alternating lines and spaces correspond to the consecutively ascending keys within each octave, respectively (block 1604). Notes positioned on the lines correspond to keys having the first color, and notes positioned substantially entirely within the spaces correspond to keys having the second color.

The (coherent) notation system of the present invention described above can stand alone as a way to notate any musical idea and be played by someone with no foreknowledge of the composition similar to that of the standard western notation system. There is such a broad and deep historical body of traditionally notated music that the present invention's intention may be to remove a level of confusion from all musical notation thereby making the traditional body of work as accessible as anything written solely with the coherent notation system.

It is not only important that each of the 12 keys/notes of each octave has a unique name, it is clarifying. To be able to judge the distance between notes by knowing their unique note names is empowering. To be able to know the notes in a chord by the chord name is a revelation of harmony. To view a key signature as a unique pattern that indicates at a glance what the keynote of the scale is, what kind of scale it is, and what all the notes of the scale are, is delightful. This music system also enables extremely easy transposition which is without frustration. The music system is meant as either a standalone system, a way to understand the traditional system, or both.

Although embodiments are described above with reference to a staff comprising twelve lines, the staff described in any of the above embodiments may alternatively comprise less or more lines. Such alternatives are considered to be within the spirit and scope of the present invention, and may therefore utilize the advantages of the configurations and embodiments described above.

The method steps in any of the embodiments described herein are not restricted to being performed in any particular order. Also, structures mentioned in any of the method embodiments may utilize structures mentioned in any of the device embodiments. Such structures may be described in detail with respect to the device embodiments only but are applicable to any of the method embodiments.

Features in any of the embodiments described in this disclosure may be employed in combination with features in other embodiments described herein, such combinations are considered to be within the spirit and scope of the present invention.

The contemplated modifications and variations specifically mentioned in this disclosure are considered to be within the spirit and scope of the present invention.

More generally, even though the present disclosure and exemplary embodiments are described above with reference to the examples according to the accompanying drawings, it is to be understood that they are not restricted thereto. Rather, it is apparent to those skilled in the art that the disclosed embodiments can be modified in many ways without departing from the scope of the disclosure herein. Moreover, the terms and descriptions used herein are set forth by way of illustration only and are not meant as limitations. Those skilled in the art will recognize that many variations are possible within the spirit and scope of the disclosure as defined in the following claims, and their equivalents, in which all terms are to be understood in their broadest possible sense unless otherwise indicated.

The invention claimed is:

1. A music system comprising:
   an asymmetrical keyboard layout comprising at least one octave, wherein each octave comprises consecutively ascending keys of consecutively alternating first and second colors, respectively, extending throughout the entirety of each octave; and
   a notation system comprising a staff comprising consecutively ascending and alternating lines and spaces, wherein the consecutively ascending and alternating lines and spaces correspond to the consecutively ascending keys within each octave, respectively;

wherein notes positioned on the lines correspond to keys having the first color, and wherein notes positioned substantially entirely within the spaces correspond to keys having the second color.

2. The music system of claim 1, wherein the notation system is free of sharps or flats.

3. The music system of claim 1, wherein the first color is black and the second color is white.

4. The music system of claim 1, wherein the staff forms two groups, wherein each group comprises six of the lines, wherein the groups are separated from each other a distance greater than a height of each of the spaces, and wherein the two groups correspond to a single clef.

5. The music system of claim 1, wherein the staff is a grand staff and forms a first group and a second group, wherein each of the first and second groups comprises twelve of the lines, and wherein the first group and the second group are separated from each other a distance greater than a height of each of the spaces.

6. The music system of claim 1, wherein the notation system further comprises a key signature in a form of a scale comprising a plurality of notes on the staff identifying the scale.

7. The music system of claim 6, wherein the plurality of notes on the staff comprising the scale includes all ascending notes of the scale.

8. The music system of claim 6, wherein the plurality of notes on the staff comprising the scale includes all ascending notes of the scale followed by all descending notes of the scale.

9. The music system of claim 1, wherein the notation system further comprises a key signature in a form of a chord comprising a plurality of notes on the staff identifying the chord.

10. The music system of claim 1, wherein the consecutively ascending keys within each octave are associated with consecutively ascending indicia 1, 2, 3, 4, 5, 6, 7, 8, 9, 10, 11, and 12 or 0, respectively.

11. The music system of claim 10, wherein a bottom line of the staff corresponds to the key associated with the indicium 1.

12. The music system of claim 10, wherein the key of "A" within each octave is associated with the indicium 1.

13. The music system of claim 10, wherein a chord name is identified by a combination of:
a root note indicium selected from one of the consecutively ascending indicia; and
an interval indicium of each other note comprising the chord.

14. The music system of claim 10, wherein a chord name is identified by a combination of:
a root note indicium selected from one of the consecutively ascending indicia; and
an interval indicium of each other note comprising the chord;
wherein each interval indicium above the root note indicium is selected from the group consisting of +1, +2, +3, +4, +5, +6, +7, +8, +9, +10, +11, and +12; and
wherein each interval indicium below the root note indicium is selected from the group consisting of −1, −2, −3, −4, −5, −6, −7, −8, −9, −10, −11, and −12.

15. The music system of claim 10, wherein a distance between any two of the consecutively ascending keys is associated with an interval name comprising a verse name and an inverse name separated by double forward slashes, and wherein a chord name is identified by a combination of:
a root note indicium selected from one of the consecutively ascending indicia; and
a plurality of verse names or a plurality of inverse names, of each other note comprising the chord.

16. The music system of claim 1, wherein the consecutively ascending keys within each octave are associated with consecutively ascending indicia 1/11, 2/10, 3/9, 4/8, 5/7, 6/6, 7/5, 8/4, 9/3, 10/2, 11/1, and 12/0 or 0/12, respectively.

17. The music system of claim 16, wherein a bottom line of the staff corresponds to the key associated with the indicium 1/11.

18. The music system of claim 16, wherein the key of "A" within each octave is associated with the indicium 1/11.

19. The music system of claim 16, wherein each of the consecutively ascending indicia defines a note name comprising a verse name and an inverse name separated by a single forward slash.

20. The music system of claim 16, wherein a chord name is identified by a combination of:
a root note indicium selected from one of the consecutively ascending indicia; and
an interval indicium of each other note comprising the chord.

21. The music system of claim 16, wherein a chord name is identified by a combination of:
a root note indicium selected from one of the consecutively ascending indicia; and
an interval indicium of each other note comprising the chord;
wherein each interval indicium above the root note indicium is selected from the group consisting of +1//11, +2//10, +3//9, +4//8, +5//7, +6//16, +7//5, +8//4, +9//3, +10//2, +11//1, and +12//0; and
wherein each interval indicium below the root note indicium is selected from the group consisting of −1//11, −2//10, −3//9, −4//8, −5//7, −6//16, −7//5, −8//4, −9//3, −10//2, −11//1, and −12//0.

22. The music system of claim 16, wherein a distance between any two of the consecutively ascending keys is associated with an interval name comprising a verse name and an inverse name separated by double forward slashes, and wherein a chord name is identified by a combination of:
a root note indicium selected from one of the consecutively ascending indicia; and
a plurality of verse names or a plurality of inverse names, of each other note comprising the chord.

23. The music system of claim 1, wherein a distance between any two of the consecutively ascending keys is associated with an interval name comprising a verse name and an inverse name separated by double forward slashes, and wherein the interval name corresponds to a number of half steps.

24. The music system of claim 23, wherein the interval name is selected from the group consisting of 1//11, 2//10, 3/19, 4//8, 5//7, 6/16, 7//5, 8//4, 9/13, 10//2, 11//1, and 12//0 or 0//12.

25. The music system of claim 1, wherein a distance between any two of the consecutively ascending keys is associated with an interval name selected from the group consisting of 1, 2, 3, 4, 5, 6, 7, 8, 9, 10, 11, and 12, and wherein the interval name corresponds to a number of half steps.

26. The music system of claim 1, wherein a chord name is identified by a combination of:

a root note indicium; and an interval indicium of each other note comprising the chord;

wherein each interval indicium above the root note indicium is selected from the group consisting of +1, +2, +3, +4, +5, +6, +7, +8, +9, +10, +11, and +12; and wherein each interval indicium below the root note indicium is selected from the group consisting of −1, −2, −3, −4, −5, −6, −7, −8, −9, −10, −11, and −12.

27. The music system of claim 1, wherein a chord name is identified by a combination of:

a root note indicium; and an interval indicium of each other note comprising the chord;

wherein each interval indicium above the root note indicium is selected from the group consisting of +1//11, +2//10, +3//9, +4//8, +5//7, +6//6, +7//5, +8//4, +9//3, +10//2, +11//1, and +12//0; and wherein each interval indicium below the root note indicium is selected from the group consisting of −1//11, −2//10, −3//9, −4//8, −5//7, −6//6, −7//5, −8//4, −9//3, −10//2, −11//1, and −12//0.

28. A method of using a music system, the method comprising:

utilizing an asymmetrical keyboard layout comprising at least one octave, wherein each octave comprises consecutively ascending keys of consecutively alternating first and second colors, respectively, extending throughout the entirety of each octave; and employing a notation system comprising a staff comprising consecutively ascending and alternating lines and spaces, wherein the consecutively ascending and alternating lines and spaces correspond to the consecutively ascending keys within each octave, respectively;

wherein notes positioned on the lines correspond to keys having the first color, and wherein notes positioned substantially entirely within the spaces correspond to keys having the second color.

29. The music system of claim 4, wherein the separation between the groups accommodates only a single note.

30. The music system of claim 5, wherein the twelve lines of each of the first and second groups comprise two sub-groups each comprising six of the lines, and wherein the two sub-groups within each of the first and second groups are separated from each other a distance greater than a height of each of the spaces.

31. The music system of claim 30, wherein the two sub-groups within the first group correspond to a first clef, and the two sub-groups within the second group correspond to a second clef.

32. The music system of claim 31, wherein the second clef is different than the first clef.

* * * * *

UNITED STATES PATENT AND TRADEMARK OFFICE
CERTIFICATE OF CORRECTION

PATENT NO. : 10,347,228 B2  Page 1 of 2
APPLICATION NO. : 15/685523
DATED : July 9, 2019
INVENTOR(S) : James Clyde McCartney It is certified that error appears in the above-identified patent and that said Letters Patent is hereby corrected as shown below:

In the Specification

In Column 10, Line 40, delete "-10, 31 11" and insert -- -10, -11 --

In Column 11, Line 25, delete "3/19" and insert -- 3//9 --

In Column 11, Line 25, delete "6/16" and insert -- 6//6 --

In Column 11, Line 25, delete "9/13" and insert -- 9//3 --

In Column 11, Line 39, delete "31 2" and insert -- -2 --

In Column 11, Line 46, delete "+6/16" and insert -- +6//6 --

In Column 11, Line 49, delete "31 61/6, 31 7//5, 31 8//4" and insert -- -6//6, -7//5, -8//4 --

In the Claims

In Column 14, Line 35, in Claim 21, delete "+3/19" and insert -- +3//9 --

In Column 14, Line 35, in Claim 21, delete "+6/16" and insert -- +6//6 --

In Column 14, Line 35, in Claim 21, delete "+91/3" and insert -- +9//3 --

In Column 14, Line 39, in Claim 21, delete "-31/9" and insert -- -3//9 --

In Column 14, Line 39, in Claim 21, delete "-6/16" and insert -- -6//6 --

In Column 14, Line 39, in Claim 21, delete "-91/3" and insert -- -9//3 --

Signed and Sealed this
                                    Third Day of September, 2019

Andrei Iancu
*Director of the United States Patent and Trademark Office*

In Column 14, Line 58, in Claim 24, delete "3/19" and insert -- 3//9 --

In Column 14, Line 58, in Claim 24, delete "6/16" and insert -- 6//6 --

In Column 14, Line 58, in Claim 24, delete "9/13" and insert -- 9//3 --